(12) United States Patent
Raj et al.

(10) Patent No.: US 9,129,129 B2
(45) Date of Patent: Sep. 8, 2015

(54) AUTOMATIC DATA PROTECTION IN A COMPUTER SYSTEM

(71) Applicant: Oracle International Corporation, Redwood Shores, CA (US)

(72) Inventors: Dilip Raj, Bangalore (IN); Rahil Mir, Bangalore (IN); Scott Rotondo, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 73 days.

(21) Appl. No.: 13/925,090

(22) Filed: Jun. 24, 2013

(65) Prior Publication Data

US 2014/0380404 A1    Dec. 25, 2014

(51) Int. Cl.
*G06F 21/00* (2013.01)
*G06F 21/62* (2013.01)

(52) U.S. Cl.
CPC ................. *G06F 21/6218* (2013.01)

(58) Field of Classification Search
USPC ......................................................... 726/1–9
See application file for complete search history.

(56) References Cited

U.S. PATENT DOCUMENTS

2009/0094193 A1* 4/2009 King et al. ................. 707/2
2013/0081101 A1* 3/2013 Baer et al. ................. 726/1

* cited by examiner

*Primary Examiner* — Ghazal Shehni
(74) *Attorney, Agent, or Firm* — Hickman Palermo Becker Bingham LLP; Daniel D. Ledesma (57) ABSTRACT

Techniques are provided for a data security system that includes two mappings: a first mapping that maps a security policy to sensitive type and a second mapping that maps the sensitive type to one or more data sets. The sensitive type indicates a class of sensitive data. Example data sets include columns, tables, tablespaces, files, and directories in a file system. Because a security policy is not tightly coupled to a target data set, the security policy becomes data-agnostic, portable, and reusable. Also, a security policy may be object-less in that, at some point in time, the security policy is not associated with any data set. A security policy may also be multifunctional in that the security policy may include multiple security features or requirements. A security policy may also be exhaustive in that all necessary security requirements prescribed for a data set can be included in the security policy.

35 Claims, 5 Drawing Sheets

AUTOMATIC DATA PROTECTION IN A COMPUTER SYSTEM

FIELD

Embodiments relate to providing data security in a computer system and, more particularly to, decoupling security policies from the target data to which the security policies apply.

BACKGROUND

Presently, the deployment of protection for sensitive data in a database is not a straight-forward task, which makes adhering to security compliance requirements difficult. For example, it is difficult to easily convert data security standards or requirements, like the ones that are set by the Payment Card Industry Data Security Standard (PCI-DSS), the Health Insurance Portability and Accountability Act (HIPAA), or even organization-specific guidelines, into security policies that achieve the same. This is because security standards encompass or prescribe many different data security technologies for sensitive data. For example, a security requirement can be that Social Security Numbers (SSN) need AES-128 encryption, need to be accessed only by some privileged Database Users (or applications), and all SELECTS on the data need to be audited. Thus, in this example, encryption, access control, and auditing are three different security technologies that are prescribed for SSNs. Today, applying these three security technologies to SSNs can be achieved with a two-phase task, Phase 1 being a pre-requisite for Phase 2.

Phase 1 is the identification of sensitive data in a database. All the columns that contain SSNs (i.e., the sensitive data in this example) need to be identified. For this, one needs to know that Social Security Numbers have 9 digits and the exact schemas, tables, and columns storing that data. In a real-world scenario where an organization might have sensitive data stored across many schemas, identifying each of the individual columns is non-trivial. This issue gets multiplied by the number of databases that the organization has.

Phase 2 involves enforcing protection on the identified sensitive data. Each of the prescribed security technologies has to be enforced individually on each of the identified sensitive data. Given the example above, encryption, access control, and auditing have to be individually deployed on each of the columns that are identified as containing Social Security Numbers, and this can be done today by having three different security policies for each of the three individual security requirements of the same compliance policy. Today, each security technology that is to be enforced requires its own separate policy.

Another problem with this approach is that in the real-world protection requirements keep changing. Highly distributed work environments add to this problem and require that security policies change with time and keep up with the changing requirements. This makes adapting to changing compliance requirements difficult.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Tightly Coupling Security Policies with Target Data

One approach for providing data security in a computer system involves directly mapping a security policy with target data. Each security feature demands its own security policy for each instance of target data (such as a column of a table). Such an approach to data security is referred to herein as the "tightly coupled" approach.

Figure 1:
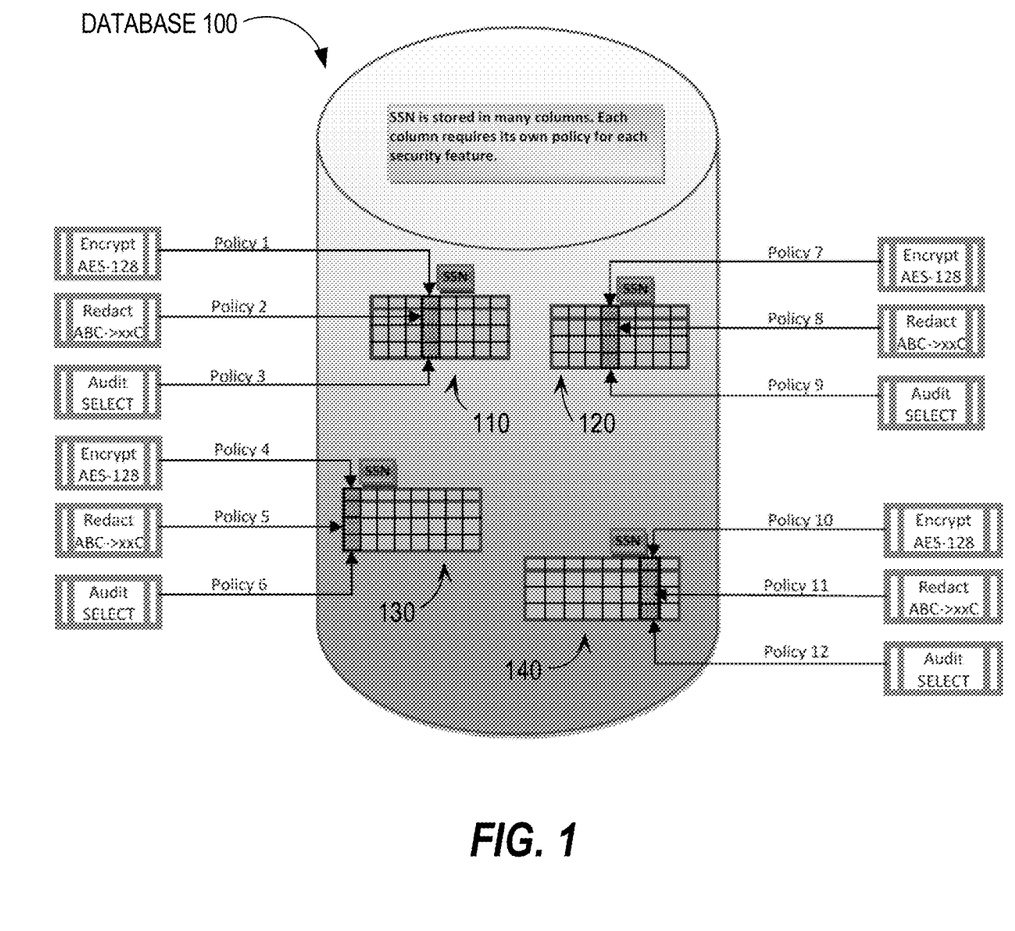
FIG. 1 is a block diagram that depicts a visualization of an example of a "tightly coupled" approach.

FIG. 1 is a block diagram that depicts a visualization of an example of the "tightly coupled" approach. The depicted example involves three security requirements for each column, in tables 110-140 of database 100, that stores social security numbers (SSNs). The three security requirements include AES-128 (Advanced Encryption Standard-128 bit) encryption, redaction where a subset of each SSN is redacted, and audit where each SELECT statement that selects data from one of the four SSN columns is audited. As FIG. 1 illustrates, each column requires its own policy for each security feature. Specifically, security policies 1-3 apply to the SSN column in table 110, security policies 4-6 apply to the SSN column in table 120, and so forth.

However, there are multiple technical problems with this tightly coupled approach. One problem is that there is a proliferation of security policies. The proliferation is a problem because it is difficult to ensure that the same policy is enforced for all data sets (e.g., columns) that contain the same kind of sensitive data. In other words, the security provided by each security policy (e.g., AES-128 encryption) is the same while just the target data is different. For example, AES-128 encryption is defined multiple times, one for each of the four SSN columns in FIG. 1.

Another problem with the tightly coupled approach is that when target data is deleted, the security policy becomes irrelevant. Because a security policy is directly mapped to an instance of target data, when that instance is deleted, the security policy is also deleted. For example, in FIG. 1, if table 110 is deleted, then policies 1-3 are deleted.

Another problem with the tightly coupled approach is that a security policy cannot be specified until the target data exists in the database and has been identified. Thus, an organization cannot plan and configure protection for its sensitive data unless the organization already has the data. There are no means to have preventive measures in place to protect data that will come in later. This mandates a one-to-one relation between sensitive data protection, which is not extendable. It is very common for organizations to expand through mergers and acquisitions, and when this happens multiple databases are usually combined. Thus, the configuration of the policies as per the standards is dependent on the availability of the target data and an administrator must wait until the target data becomes available to configure a policy for the target data.

Another problem with the tightly coupled approach is that security policies are not portable. Security policies cannot be moved across databases without also moving the target data along with them.

Another problem with the tightly coupled approach is that a security policy is not reusable. When a new instance of target data arrives in a computer system, an existing security policy cannot be reused. Instead, a new instance of the security policy needs to be defined. For example, if a fifth table is stored in database 100 and the table has an SSN column that is to have the same protection as the other four SSN columns, then three new policies need to be defined.

Another problem with the tightly coupled approach is that the approach is not easily manageable. When one or more security features change, multiple security policies have to be rewritten. Such rewriting is a manual process that is error prone and can cause inconsistencies, such as a policy being wrongly updated. Such rewriting can also cause incomplete security in that all changes may be not implemented correctly.

In addition to technical problems, there are business problems with the tightly coupled approach. For example, a significant amount of administrative effort is required to ensure that each instance of target data is protected according to a data security compliance specification that indicates how certain instances of target data are to be protected, especially if the compliance specification is relatively detailed. The greater the number of human hours that are required to comply with the compliance specification, the greater the cost to the organization that is responsible for the target data.

Another business problem is the risk of non-compliance. Because the tightly coupled approach is prone to inconsistency and incompleteness, there is a significant possibility that sensitive data is not protected as required by compliance requirements reflected in the compliance specification. This risk in non-compliance may result in a security breach and, thus, an exposure of sensitive data. Also, the loss or exposure of sensitive client data may result in serious legal issues.

General Overview

In contrast to the tightly coupled approach, a different approach is followed that avoids at least some of the problems of the tightly coupled approach. Techniques are described herein for implementing a "loosely coupled" approach. In the loosely coupled approach, a data security system includes at least two different mappings: a first mapping between one or more security policies and one or more sensitive types and a second mapping between one or more sensitive types and one or more data sets. A sensitive type refers to a class of data (which may be stored in varying storage formats) that is to be protected in the same way. By associating multiple data sets with a single sensitive type, only one security policy needs to be defined once for all the data sets.

In this way, security policies are loosely coupled to the data sets against which the security policies are applied. In other words, a security policy is not directly associated with a data set. Instead, a security policy is indirectly associated with a data set. Such a level of indirection provides significant benefits.

Although the following description is generally in the context of tables and columns as example data sets, embodiments are not limited to the database context. For example, a data set may be a file or directory in a file system.

Process Overview

Figure 2:
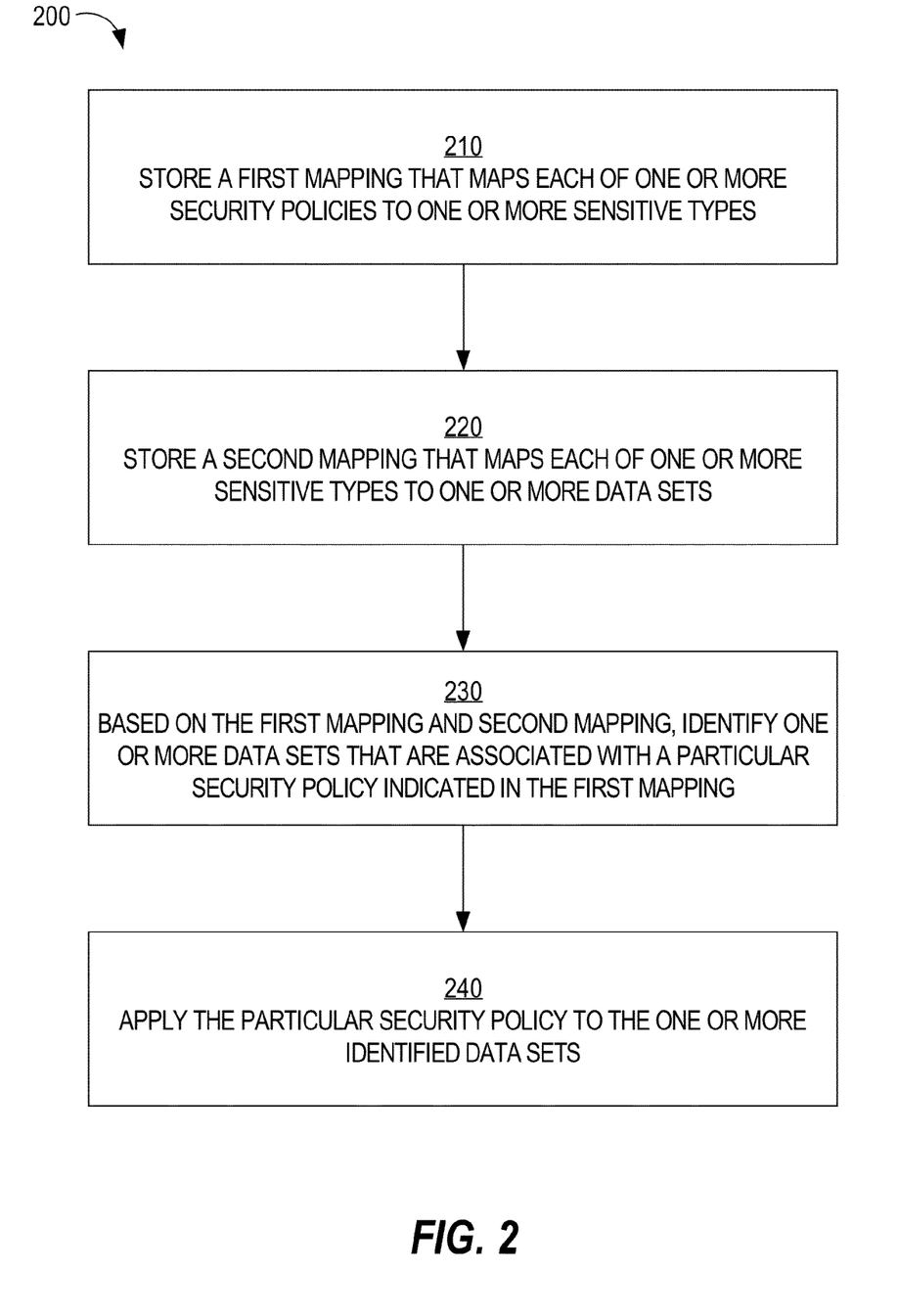
FIG. 2 is a flow diagram that depicts a process 200 for providing data security in a computer system, in an embodiment.

FIG. 2 is a flow diagram that depicts a process 200 for providing data security in a computer system, in an embodiment.

At block 210, a first mapping is stored in the computer system. The first mapping stores data that maps, for each security policy, the security policy to one or more sensitive types. A sensitive type may map to one or more security policies. A security policy includes one or more security features or requirements, examples of which include encryption, redaction, auditing, and access control. The first mapping may be generated based on user input received at the computer system or may be hard-coded, at least initially.

At block 220, a second mapping is stored in the computer system. The second mapping stores data that maps, for each sensitive type, the sensitive type to one or more data sets. A data set may map to one or more sensitive types. The second mapping may also be generated based on user input received at the computer system or may be hard-coded, at least initially.

At block 230, based on the first mapping and the second mapping, one or more data sets are identified as being associated with a particular security policy that is indicated in the first mapping. Block 230 may involve reading, in the first mapping, a mapping (or association) between the particular security policy and a particular sensitive type and reading, in the second mapping, a mapping (or association) between the particular sensitive type and the one or more data sets.

At block 240, the particular security policy is applied to the one or more identified data sets. "Applying" a security policy depends on the type of security feature(s) that are included in the security policy. For example, if a security policy includes encryption, then applying the security policy involves encrypting one or more data values in the one or more identified data sets. As another example, if a security policy includes auditing, then applying the security policy involves generating data that will be used to determine whether to audit future accesses (e.g., queries, database statements) of the identified data set(s).

Example Security Features

As noted previously, example security features or requirements include encryption, redaction, auditing, and access control. "Encryption" is a process of encoding information in such a way that eavesdroppers, hackers, or other unauthorized individuals cannot read the information. Encrypting a data item may involve using an encryption algorithm that takes, as input, the data item and an encryption key. Only the intended data management program, which provides decrypted data only to authorized users, has access to a decryption key (which may be the same as or different than the encryption key) and, thus, are able to decrypt the encrypted data item to generate the "unencrypted" data item. For example, a security administrator may desire to have all social security numbers (SSNs) in a column of a table to be encrypted. The security administrator initiates an encryption process that involves encrypting each SSN in the column and may involve replacing the unencrypted SSNs with the encrypted SSNs.

"Redaction" with respect to a particular data set refers to suppressing, editing, or censoring a portion of the particular data set before providing access to that portion. For example, a security feature of redacting that is applied to SSNs in a column of a table may involve changing the first five digits of each SSN in the column to a different character (e.g., "X"). Thus, a SSN of "123-45-6789" would become "XXX-XX-6789" after one version of redaction. The original SSNs may be made accessible only to an administrator or other authorized personnel while the redacted versions of the SSNs may be made accessible to a larger group of individuals.

"Auditing" with respect to a particular data set refers to tracking who has requested or accessed the particular data set and/or when such requesting or accessing occurred. For example, a database administrator may desire to see who is requesting data from an Employees table that contains sensitive employee information, such as salary information, date of birth information, and SSN information. Auditing a particular data set may involve storing data or establishing one or more settings that indicate that whenever the particular data set is requested or accessed (e.g., read, updated, or deleted), auditing data is created and stored, where the auditing data indicates who requested/accessed the particular data set and/or when the particular data set was requested/accessed. For example, in response to receiving a database (e.g., SQL) statement, a query processor (1) determines which tables (or other database objects) are indicated in the database statement and (2) determines (e.g., based on analyzing auditing settings) whether any of the indicated database objects is subject of an auditing security feature.

"Access control" with respect to a particular data set refers to controlling who can access the particular data set and/or when the particular data set can be accessed. "Access" to a particular data set refers to reading, inserting, updating, or deleting data in the particular data set. Thus, one set of users may be permitted to read a particular data set, while a different set of users (e.g., a subset of the one set) may be allowed to update the particular data set, while only one user may be allowed to delete the particular data set.

Sensitive Type and Mappings

As noted previously, there are two mappings: a security policy-to-sensitive type mapping (also referred to herein as the "first mapping") and a sensitive type-to-data set mapping (also referred to herein as the "second mapping"). The first mapping includes one or more associations, each association mapping a security policy to a sensitive type. The second mapping includes one or more associations, each association mapping a sensitive type to at least one data set.

A sensitive type refers to a class of data that is to be protected in the same way. That is, the same security policies are applicable to all the data of the same sensitive type. A security policy is not directly associated with a data set. Rather, a security policy is indirectly associated with a data set through a sensitive type and both mappings. Such a level of indirection provides numerous benefits, as described herein.

Multiple sensitive types may be specified in both mappings.

With regard to the name of a sensitive type, the name may be hard-coded or user-defined. For example, there may be a pre-defined "Highly Confidential" sensitive type and a "Low Confidential" sensitive type. User-defined names for sensitive types may be "SSN" and "Salary", which refer to the type of data that is being protected or "Priority A" and "Priority B" which are generic names that might indicate some relative level of importance to an administrator.

Each association in the first mapping may include feature data that identifies each security feature that is included in the security policy and type data that identifies the sensitive type. Alternatively, an association in the first mapping may include policy data that identifies the security policy and type data that identifies the sensitive type. In such an implementation, a separate mapping (e.g., table) may associate the security policy with each security feature that belongs to the security policy.

Each association in the second mapping includes type data that identifies a sensitive type and target identification data that identifies one or more data sets. Thus, one or more associations may map a sensitive type to a list of one or more data sets. Also, a single data set (e.g., column or file) may be associated with multiple sensitive types and, thus, through the first mapping, multiple security policies.

In one implementation, no two associations in the second mapping include type data that identifies the same sensitive type. Alternatively, two or more associations include type data that identifies the same sensitive type.

The first and second mappings may be implemented in any number of ways. For example, each mapping may be implemented as a table of rows with at least two columns. For the first mapping, one column is for storing data that indicates a security policy and another column is for storing data that indicates a sensitive type. For the second mapping, one column is for storing data that indicates a sensitive type and another column is for storing data that indicates a data set (e.g., a target column or file). As another example, each mapping may be implemented as a two-dimensional array.

Example of a "Loosely Coupled" Security Policy

Figure 3:
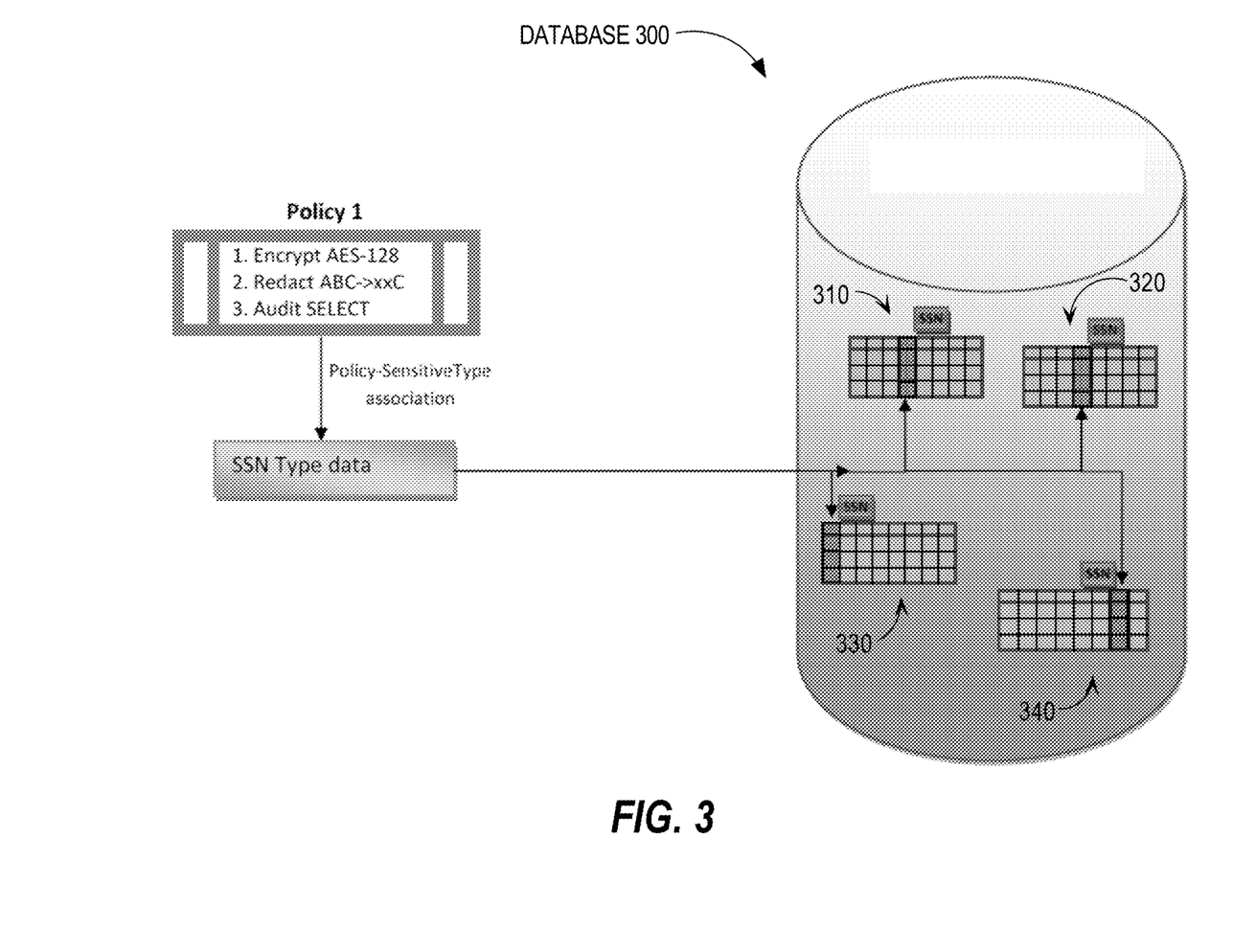
FIG. 3 is a block diagram that depicts an example of a security policy that is indirectly associated with target data, in an embodiment.

FIG. 3 is a block diagram that depicts an example of a security policy that is indirectly associated with target data, in an embodiment. Database 300 stores four tables: 310-340. Each of tables 310-340 includes a column that stores SSNs. Each of the four SSN columns is associated, in a second mapping, with the sensitive type "SSN Type data."

In a first mapping, the sensitive type "SSN Type data" is associated with Policy 1, which includes three security features: AES-128 encryption, redaction, and auditing of SELECT statements. Thus, based on the first and second mappings, Policy 1 (and its security features) is associated with the four SSN columns of tables 310-340.

A benefit of being able to define a security policy for the first mapping is that the security policy does not have to be associated (through a sensitive type and the second mapping) with any target data. For example, initially, Policy 1 in FIG. 3 may not be associated with any of the SSN columns in tables 310-340. In a sense, a security policy in embodiments herein is considered "objectless" in that the security policy does not need any target data as input. The security policy only defines the protection and indicates nothing about the target data on which the security policy acts. For example, a policy created for SSN can require: (1) AES-128 encryption; (2) that access be given only to some privileged database users (or applications); and (3) SELECTS on the data needs to be audited. The policy does not define the target data on which the policy acts. The target data is determined using a configuration (i.e., the first mapping) that maps security policies with classes of sensitive data.

This decoupling of security policy from target data has many advantages. One advantage is that, since the target data is not a pre-requisite for creating/altering a security policy, security policies can be created/altered even before any target data exists. For an organization where at least a part of its data is a contingency (a contingent input), the planning of protection for the sensitive data need not wait for the incoming data to arrive. It is very common for organizations to expand through mergers and acquisitions and, when a merger/acquisition happens, multiple databases are usually combined. In such situations, the objectless security policies that are already created can be re-used or extended to include the incoming data.

Another advantage with using objectless security policies is that such policies become portable: once created, the security policies can be moved across databases and configured appropriately in the target database. This is possible because a security policy is not tied to any target data and the policy can potentially act on any data set as per the security configuration in the database in which the policy resides.

Example System

Figure 4:
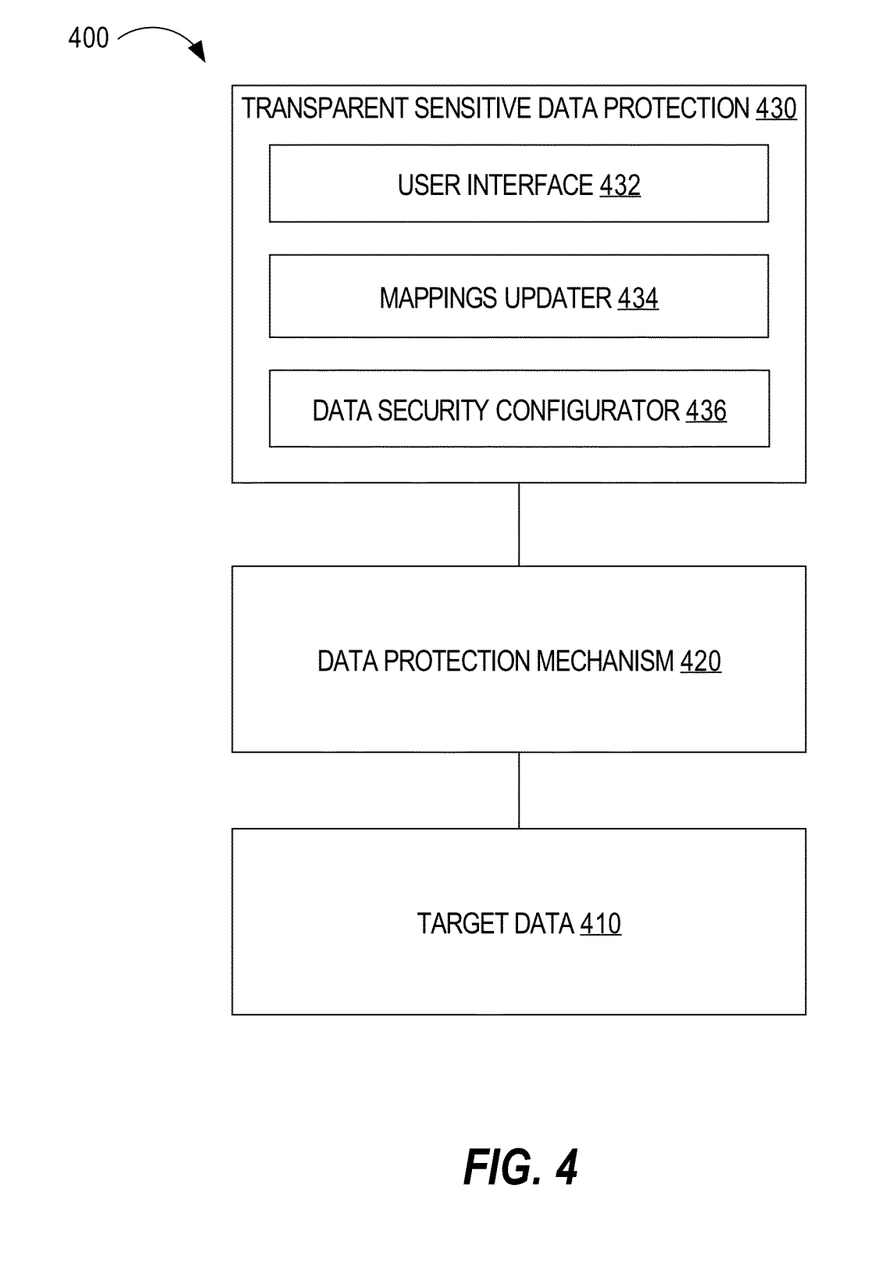
FIG. 4 is a block diagram that depicts an example data security system 300, in an embodiment.

FIG. 4 is a block diagram that depicts a data security system data model 400, in an embodiment. Data model 400 includes three main components: target data 410, a data protection mechanism 420, and a transparent sensitive data protection (TSDP) mechanism 430.

Target data 410 is data that may be protected based on one or more data security policies. Examples of types of target data 410 include a column of table, a table, a file, a directory, a schema, a partition, and a tablespace (which is a logical or physical storage location that stores multiple data objects, such as tables, object-oriented objects, files, and/or directories). Target data 410 may be stored on one or more physical storage devices.

Data protection mechanism 420 performs the step of applying a security feature to a data object. Examples of such security features include encryption, redaction, auditing, and access control. Data protection mechanism 420 is responsible for applying multiple types of security features to one or more data sets. In this way, a developer of TSDP mechanism 430 does not have to deal with directly applying security features to data sets.

Data protection mechanism 420 may be implemented in hardware, software, or any combination of hardware and software. The functionality of data protection mechanism 420 may be implemented on a single computing device or may be distributed among multiple computing devices.

Data protection mechanism 420 stores (or otherwise has access to) data about multiple data sets. For example, data protection mechanism 420 stores data that associates, for each data set of multiple data sets, one or more security features that have been (or are about to be) applied to the data set. For example, data protection mechanism 420 may store association data that associates a column of a table in a database system with a redaction security feature. Data protection mechanism 420 may store the association data in response to an instruction from TSDP mechanism 430 and in response to (or immediately before) applying the redaction security feature to data in the column.

Even though data protection mechanism 420 is depicted as a single entity, mechanism 420 may include multiple distinct entities. For example, mechanism 420 may include an encryption mechanism, a redaction mechanism, an auditing mechanism, and an access control mechanism. In this way, each different mechanism stores (or has access to) information only about data sets against which the corresponding protection mechanism applies.

TSDP mechanism 430 provides a layer of abstraction for a data administrator (or security personnel) who is responsible for ensuring that the target data 410 is appropriately protected according to a security specification. TSDP mechanism 430 allows the data administrator to quickly and efficiently ensure that target data 410 is protected as well as make changes to data security if the security specification changes.

TSDP mechanism 430 includes a user interface 432 that allows an administrator to specify (1) one or more security policies that are to be associated with a sensitive type and (2) one or more sensitive types that are to be associated with one or data sets in target data 410. Examples of user interface 432 include a command line interface (CLI) and a graphical user interface (GUI).

TSDP mechanism 430 includes a mappings updater 434 that takes, as input, user input received through user interface 432, and updates a security policy-to-sensitive type mapping and/or a sensitive type-to-data set mapping (also referred to herein as the "second mapping"). Although not shown, such mappings may be stored in persistent storage within TSDP mechanism 430 or outside (e.g., remote from) TSDP mechanism 430. Also, although depicted in FIG. 4 as separate components, user interface 432 and mappings updater 434 may be part of the same (e.g., software) component.

TSDP mechanism 430 includes a data security configurator 436 that is responsible for determining which security policies are associated with which data sets and sending one or more instructions to data protection mechanism 420. Data security configurator 436 may be triggered to perform the determination in response to detecting that either the first mapping or the second mapping has changed. For example, if a new association between a security policy and a sensitive type is stored in the first mapping, then data security configurator 436 is notified (e.g., by mappings updater 434).

Additionally or alternatively, data security configurator 436 may periodically check (e.g., every 10 seconds or minute) the first mapping and the second mapping to determine whether either mapping has changed since the most current security configurations have been applied.

In the embodiment, data security configurator 436 communicates with data protection mechanism 420 in any number of ways. For example, data protection mechanism 420 exposes an application programming interface (API) that data security configurator 436 may call to in order for data protection mechanism 420 to apply one or more security features to portions of target data 410 or to update security configurations with respective to portions of target data 410. For example of the latter, data security configurator 436 may inform data protection mechanism 420 that a data set in target data 410 should no longer be protected with a first level of protection and that the data set should be protected with a second level of protection that is different than the first level of protection. Such a communication may involve one or more API calls by data security configurator 436 to data protection mechanism 420.

For example, given the last example, data security configurator 436 may make a first API call that specifies the data set and the first level of protection and that indicates that the first level of protection is to be undone. Data security configurator 436 may then make a second API call that specifies the data set and the second level of protection and that indicates that the second level of protection is to be applied against the data set. Thus, a single change in one of the two mappings may result in data security configurator 436 making multiple API calls.

In the embodiment where data protection mechanism 420 comprises multiple data protection mechanisms, one for each type of protection, each data protection mechanism may expose a different API to data security configurator 436. Thus, in response to applying a security policy that includes multiple security features to a data set, data security configurator 436 may make multiple API calls, one or more for each applicable protection mechanism, such as an encryption mechanism, a redaction mechanism, an audit mechanism, and an access control mechanism.

Although depicted in FIG. 4 as separate components, mappings updater 434 and data security configurator 436 may be part of the same (e.g., software) component.

In an embodiment, TSDP mechanism 430 is integrated with data protection mechanism 420. In such an embodiment, an API to allow data security configurator 436 to communicate data to data protection mechanism 420 would not be necessary. Instead, data security configurator 436 may itself be responsible for applying the security feature(s) indicated in a security policy to one or more data sets based on both mappings.

Multifunctional Security Policy

In an embodiment, a security policy includes multiple security features, such as Policy 1 in FIG. 3. In this way, a security policy may be considered "multifunctional." The ability to include multiple security features in a single security policy has the benefit of reducing the amount of user interaction to initiate the application of multiple security features to multiple data sets and to change the association between security features and data sets. Specifically, multiple security features may be applied to multiple data sets without a security administrator being required to separately indicate for each data set, a different security feature.

For example, if a set of data security compliance requirements requires that, for each data set of ten data sets, three security features are to be applied to the data set, then, under the tightly coupled approach, a security administrator might have to create and submit 10*3=30 separate commands or instances of user input. In contrast, according to an embodiment where a single security policy includes the three security features, a security administrator may only have to create and submit a single command (if each data set is already associated with the same sensitive type), which is to associate the security policy with the appropriate sensitive type. Otherwise, if each data set is not already associated with the appropriate sensitive type, then the security administrator may have to submit 11 commands (ten commands for associating each data set with the sensitive type and one command for associating the security policy with the sensitive type), which is significantly less than 30.

Adding a New Security Policy

The first mapping may be changed or updated in a number of ways. In one way, a new security policy is defined and added to the first mapping. For example, a security administrator may provide input (e.g., submit a command through user interface 432) to create a new security policy and define the security feature(s) for that new security policy. The input may indicate a name or identifier for the new security policy and a name or identifier for each security feature that is to be included in the new security policy. The security administrator may also submit data that associates a sensitive type with the new security policy. The sensitive type may be a sensitive type that (a) is already indicated in another association in the first mapping, (b) is indicated in one or more associations in the second mapping, or (c) is new (i.e., not indicated in either the first mapping or the second mapping).

In an embodiment, in response to adding a new security policy to the first mapping, a determination is automatically made of whether the security feature(s) indicated in the new security policy are to be applied to any data sets. This determination may be made by data security configurator 436 in TSDP mechanism 430. This determination is made by determining a sensitive type with which the new security policy is associated and then determining, based on the second mapping, whether that sensitive type is associated with any data sets indicated in the second mapping. If it is determined that the sensitive type that is associated with the new security policy is not associated with any data sets, then determining whether the security feature(s) indicated in the new security policy are to be applied to any data sets may be avoided.

Data-Agnostic Security Policies

Because a security policy as disclosed herein is loosely coupled to target data and, in fact, may not be associated with any data set initially, the security policy is considered "data-agnostic." The security policy indicates what protection is provided by the security policy; the security policy does not indicate any target data (thus, the security policy is objectless, as described previously). The security policy may be used on the same kind of data (sensitive type) irrespective of the data characteristics.

For example, in FIG. 3, the different SSN columns can be different in the way the data in those columns is stored. For example, the SSN column of table 310 may be a VARCHAR datatype while the SSN column of table 320 may be a NUMBER datatype. Policy 1 may be configured to be applicable to all SSN columns irrespective of these characteristics. While the objectless nature of the security policy allows decoupling of protection from target data, the data-agnostic nature allows decoupling of protection from implementation details. Such data "agnosticism" provides a level of abstraction that makes configuration of protection relatively easy.

Thus, in response to a user input that creates Policy 1 of FIG. 3 where the SSN columns of tables 310-340 are also associated with the "SSN Type data," a determination is automatically made, using the first and second mappings, which data sets are associated with Policy 1. The user (e.g., security administrator) does not have to consider the data types of any of the SSN columns. Instead, a computer process (e.g., data security configurator 436) automatically determines the type of each SSN column and is responsible for taking into account the datatype of each SSN column when accessing the data stored in the respective columns (if necessary, depending on the type of security feature being applied).

Adding a Security Feature

Another way in which the first mapping may be changed or updated is adding a security feature to an existing security policy indicated in the first mapping. For example, a security administrator may provide input that indicates an existing security policy indicated in the first mapping and that includes a name or identifier of a security feature that is to be added to the existing security policy.

In an embodiment, in response to adding a security feature to an existing security policy indicated in the first mapping, a determination is automatically made of whether the added security feature is to be applied to any data sets. Again, this determination may be made by data security configurator 436 in TSDP mechanism 430. Similar to the situation where the change is adding a new security policy, this determination is made by determining a sensitive type with which the updated security policy is associated and then determining, based on the second mapping, whether that sensitive type is associated with any data sets indicated in the second mapping.

Adding a Sensitive Type

Another way in which the first mapping may be changed or updated is associating a new sensitive type with an existing security policy indicated in the first mapping. For example, a security administrator may provide (e.g., through user interface 432) input that indicates a name or identifier for the new sensitive type that is to be added to the existing security policy. If the existing security policy is already associated with a particular sensitive type and no data set is currently associated with the new sensitive type, then it may be less burdensome for the security administrator to associate target data sets with the particular sensitive type (that is already associated with the existing security policy). For example, if security policy SP is associated with sensitive type ST in the first mapping and data set DS is not yet associated with any security policy, then the second mapping may be updated to associate ST with DS.

Removing a Security Policy

Another way in which the first mapping may be changed or updated is deleting or otherwise removing a security policy from an association included in the first mapping or from multiple (e.g., all) associations, in the first mapping, that indicate the security policy. Such a removal may be based on input from a user (e.g., through user interface 432) or automatically in response to an event, time-based or otherwise. Deletion of a security policy from the first mapping may result in all associations, in the first mapping, between the security policy and sensitive type(s) also being deleted or removed from the first mapping. Alternatively, any indication of a sensitive type that mapped to the deleted security policy may still remain in the first mapping, but without being associated with the deleted security policy.

In an embodiment, in response to the deletion of a security policy from the first mapping, a determination is automatically made to "undo" the security feature(s) that were included in the security policy relative to the one or more data sets that were associated with the deleted security policy through the first and second mappings. This determination may involve identifying which sensitive types are/were associated with the deleted security policy in the first mapping and then determine, for each identified sensitive type, which data sets are associated with the identified sensitive type.

For example, in FIG. 3, if policy 1 is deleted, then the sensitive type "SSN Type data" is identified in the first mapping. Based on the second mapping, each SSN column of tables 310-340 is identified as being associated with SSN Type data.

Once the data sets associated with the deleted security policy are identified, the security feature(s) indicated in the deleted policy are "undone" or removed. "Removing" or "undoing" a security feature with respect to a data set refers to undoing the effects of applying the security feature to that data set. For example, removing the AES-128 encryption in FIG. 3 involves decrypting each SSN in each SSN column of tables 310-340 and replacing the encrypted SSNs with unencrypted SSNs. As another example, removing the audit security feature 3 in FIG. 3 may involve removing or deleting audit data (not depicted) that indicates that each SSN column in tables 310-340 is to be audited in response to a database statement that includes a SELECT clause that identifies one of the SSN columns. As another example, removing the redaction security feature 2 in FIG. 3 may involve removing the redaction metadata (which is used when the associated target data is accessed) that indicates that the target data is to be redacted.

The acts of "undoing" a security feature may be performed by TSDP mechanism 430 (or, specifically, data security configurator 436) or data protection mechanism 420. For example, data security configurator 436 may send, to data protection mechanism 420, an API call that indicates: (1) a security feature; (2) a data set; and (3) that the security feature is to be "undone" with respect to the data set.

Removing a Security Feature

Removing a security feature from a security policy is similar in some respects to the process of removing a security policy from the first mapping. The removal of a security feature from a security policy may be performed in response to user input that indicates the security feature and, optionally, the security policy to which the security feature belongs.

If all instances of a security feature are to be deleted or removed from the first mapping, then the user input may not only indicate the security feature, but may also indicate each individual security policy in which the security feature is included. Alternatively, instead of the user input individually indicating each security policy, the user input may only indicate that the removal of the security feature applies to all security policies indicated in the first mapping, without requiring a user to separately or individually specify each security policy.

In FIG. 3, if security feature 1 (i.e., AES-128 encryption) of Policy 1 is to be deleted, then the user input may specify (or otherwise indicate) "Policy 1" and "Feature 1." If AES-128 encryption is to be removed throughout database 300, then the user input may specify "AES-128 encryption" and "All Policies" (indicating all policies that include AES-128 encryption).

In response to determining that a security feature is to be removed from a security policy, a determination of which data set(s) (if any) are associated with the security feature is automatically made (e.g. by configurator 436). This determination may involve: (1) identifying (e.g., based on user input) the security policy (or policies) from which the security feature is to be deleted; (2) identifying, based on the first mapping, one or more sensitive types that are associated with the determined security policy; (3) identifying, for each identified sensitive type, based on the second mapping, which data sets are associated with the identified sensitive type. Once the appropriate data sets are identified, then the security feature "undone" or removed with respective to those data sets.

Also, in response to determining that a security feature is to be removed from a security policy, a check may be performed to determine whether the security policy will include any other security features. If not, then the first mapping may also be automatically updated to remove the security policy.

Removing a Sensitive Type

Another way in which the first mapping or the second mapping may be changed or updated is removing a sensitive type from the first mapping. Such removal may remove only a single instance of the sensitive type from the first mapping or multiple (e.g., all) instances of the sensitive type from the first mapping (if the sensitive type is associated with multiple security policies). Removing a sensitive type from the first mapping may be performed in response to user input that indicates the sensitive type. For example, security administrator may specify "SSN type data" (indicated in FIG. 3).

In an embodiment, in response to receiving input that indicates that a sensitive type is to be removed from the first mapping, then the one or more security policies that are associated with the sensitive type in the first mapping are identified and the one or more data sets that are associated with the sensitive type in the second mapping are identified. The security feature(s) included in the one or more identified security policies are "undone" with respect to the one or more identified data sets. For example, in response to removing the "SSN type data" (indicated in FIG. 3) from the first mapping, security features 1-3 of Policy 1 and each of the SSN columns of tables 310-340 are identified. Then, security features 1-3 of Policy 1 are "undone" with respect to the identified SSN columns.

Adding and Removing Data Sets

One way in which the second mapping may be changed or updated is by adding or removing data sets from the second mapping.

Adding a data set to the second mapping may involve creating a new sensitive type (i.e., that is not indicated in the second mapping) or associating the data set with a sensitive type that is already indicated in the second mapping. In response to receiving input that associates a new data set to an existing sensitive type, the second mapping is updated (e.g., by mappings updater 434) to indicate the association. Also, the first mapping is automatically analyzed (e.g., by data security configurator 436) to identify one or more security policies that are associated with the sensitive type. Then, the security feature(s) included in the one or more security policies are applied to the new data set (e.g., by data protection mechanism 420).

Alternatively, if the sensitive type is new and is not already indicated in the first mapping, then analyzing the first mapping is unnecessary.

In response to receiving input to remove a data set from the second mapping, the second mapping is so updated (e.g., by mappings updater 434). Also, one or more sensitive types that are associated (in the second mapping) with the data set are automatically identified (e.g., by data security configurator 436). Also, the first mapping is automatically analyzed (e.g., by data security configurator 436) to identify one or more security policies that are associated with the one or more sensitive types. Then, the security feature(s) included in the one or more security policies are "undone" with respect to the removed data set (e.g., by data protection mechanism 420). Thus, a security administrator merely has to provide input that associates an incoming data set with a sensitive type (if the incoming data set does not already include accompanying data that indicates a sensitive type) in order to ensure that multiple security policies are applied to the data set.

Analyzing the first mapping and undoing the security features in the case of removing a data set from the first mapping may be unnecessary if the data sets are completely removed (or "dropped") from the computer system. Instead, simply updating the second mapping may be sufficient.

Conflict Detection and Resolution

In some situations, two security policies that are applied to a data set may conflict with each other. For example, a first security policy for a table may require one type of encryption while a second security policy for a column of the table may require another type of encryption. As another example, a first security policy for a first column of a table may require one type of redaction while a second security policy for a second column of the table may require another type of redaction, where there is a restriction that multiple columns of the same table cannot have different types of redaction.

In an embodiment, a conflict is detected before applying a security feature to a data set. For example, in response to adding a security feature to a security policy indicated in the first mapping, the first and second mappings are used to identify one or more data sets that are associated with the security policy. For each identified data set, the second and first mappings are used again to identify all security features that have been applied to the data set. If an identified data set is already associated with an existing security feature that conflicts in any way with the added security feature, then a conflict is detected.

A conflict may be resolved in any number of ways. One way to resolve a conflict is to determine which of the two security features provides greater protection. For example, if the two security features are two different types of encryption where one is more secure than the other, then the more secure encryption is applied (if not already applied) to the data set(s). Another way to resolve a conflict is to deny applying the security feature that has not yet been applied to the data set(s). For example, if the two security features are read-only access and write access and write access has already been applied, then read-only access is not applied, even though it provides greater protection. In this way, deference is given to the "older" security feature.

Conversely, another way to resolve a conflict is to undo the "old" security feature and apply the "new" security feature to the data set(s). In this way, deference is given to the "new" security feature.

Another way to resolve a conflict is to notify a user, such as a security administrator. The conflict may be indicated in an email or text message sent to the security administrator or in a pop-up message on a computer display of the security administrator. Whatever communication channel is used, the message may indicate the conflicting security features and identify the one or more data sets involved. In this way, TSDP mechanism 430 does not require the logic to determine how to resolve the conflict, especially since the TSDP mechanism 430 may not have information (which may not be machine-readable) about what the data security compliance requirements are.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
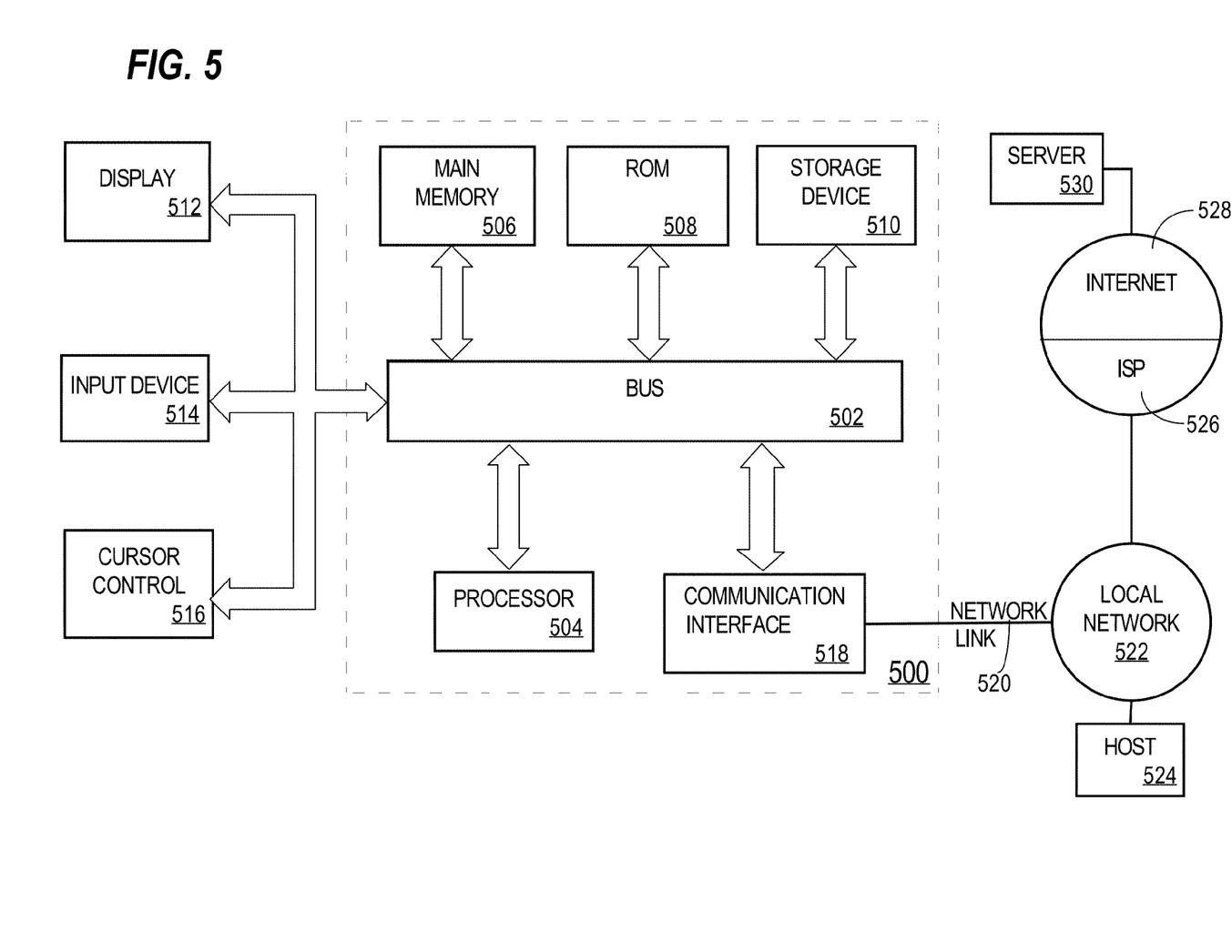
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   storing, in a computer system, a first mapping that maps a data security policy to a sensitive type, wherein the data security policy includes a particular security feature;
   storing, in the computer system, a second mapping that maps the sensitive type to one or more data sets;
   based on the first mapping and the second mapping, causing the particular security feature to be applied to each data set of the one or more data sets;
   wherein the method is performed by one or more computing devices.

2. The method of claim 1, wherein a data set in the one or more data sets is one of a tablespace, a table, a column of a table, a file in a file system, or a directory in the file system.

3. The method of claim 1, wherein:
   the data security policy includes a plurality of security features that includes the particular security feature;
   the method further comprising causing each security feature of the plurality of security features to be applied to each data set of the one or more data sets.

4. The method of claim 1, wherein:
   the particular security feature is related to a first type of security;
   a second security feature, in the data security policy, that is different than the particular security feature and is related to a second type of security that is different than the first type of security;
   the first type of security is one of encryption, redaction, access control, or auditing;
   the second type of security is another one of encryption, redaction, access control, or auditing.

5. The method of claim 1, wherein:
   the second mapping maps the sensitive type to a plurality of data sets;
   causing comprises causing the particular security feature to be applied to each data set of the plurality of data sets.

6. The method of claim 5, wherein the plurality of data sets includes:
   a first data set that is in a first data object, and
   a second data set that is in a second data object that is different than the first data object.

7. The method of claim 1, further comprising:
   receiving input that indicates adding a new security feature to the data security policy;
   in response to receiving the input:
     updating the data security policy to indicate the new security feature,
     based on the new security feature and the second mapping, causing the new security feature to be applied to each data set of the one or more data sets.

8. The method of claim 1, further comprising:
   receiving input that indicates associating, within the first mapping, a second sensitive type with a second security policy that includes a plurality of security features;
   in response to receiving the input:
     updating the first mapping to include an association between the second security policy and the second sensitive type;
     identifying one or more second data sets that are associated, in the second mapping, with the second sensitive type;
     causing each security feature in the plurality of security features to be applied to each data set in the one or more second data sets.

9. The method of claim 1, further comprising:
   receiving input that indicates deleting the particular security feature from the data security policy;
   in response to receiving the input:
     updating the data security policy to not indicate the particular security feature,
     based on the second mapping and updating the data security policy, causing the particular security feature to be undone relative to each data set of the one or more data sets.

10. The method of claim 1, further comprising:
   receiving input that indicates deleting, in the first mapping, an association between a second sensitive type and a second security policy that includes a plurality of security features;
   in response to receiving the input:
     updating the first mapping to exclude the association between the second security policy and the second sensitive type;
     identifying one or more second data sets that are associated, in the second mapping, with the second sensitive type;
     causing each security feature in the plurality of security features to be undone relative to each data set in the one or more second data sets.

11. The method of claim 1, wherein:
   after storing the first mapping and prior to storing the second mapping and causing the particular security feature to be applied, the particular security feature is not applied to any data set;
   the method further comprising receiving input that indicates the second mapping;
   causing the particular security feature to be applied is performed in response to receiving the input.

12. The method of claim 1, further comprising:
   receiving input that indicates a second sensitive type that is to be associated with the data security policy;
   in response to receiving the input, updating the first mapping to indicate an association between the data security policy and the second sensitive type.

13. The method of claim 1, further comprising:
   receiving input that indicates (1) a particular data set that is different than each data set in the one or more data sets and (2) that the particular data set is to be associated with the sensitive type;
   in response to receiving the input:
     updating the second mapping to indicate an association between the sensitive type and the particular data set;
     based on the first mapping and the updating, causing the particular security feature to be applied to the particular data set.

14. The method of claim 1, wherein storing the first mapping comprises storing the first mapping that maps the data security policy to a plurality of sensitive types that includes the sensitive type.

15. The method of claim 1, wherein causing the particular security feature to be applied to each data set of the one or more data sets comprises calling, by a first component, an application programming interface (API) of a second component that is different than the first component and that applies, based on calling the API, the particular security feature to each data set of the one or more data sets.

16. The method of claim 1, wherein:
causing the particular security feature to be applied to each data set of the one or more data sets comprises causing a plurality of security features that includes the particular security feature to be applied to each data set of the one or more data sets;
the plurality of security features includes a first security feature and a second security feature that is different than the first security feature;
causing the plurality of security features to be applied to each data set of the one or more data sets comprises:
calling, by a first component, a first application programming interface (API) of a second component that is different than the first component and that applies, based on calling the first API, the first security feature to each data set of the one or more data sets;
calling, by the first component, a second application programming interface (API) of a third component that is different than the first component and the second component and that applies, based on calling the second API, the second security feature to each data set of the one or more data sets.

17. The method of claim 1, wherein:
causing the particular security feature to be applied to each data set of the one or more data sets comprises causing the particular security feature to be applied to each data set of a plurality of data sets;
the plurality of data sets includes a first data set and a second data set that is different than the first data set;
causing the particular security feature to be applied to each data set of the one or more data sets comprises:
calling, by a first component, a first application programming interface (API) of a second component that is different than the first component and that applies, based on calling the first API, the particular security feature to the first data set;
calling, by the first component, the first API of the second component that applies, based on calling the first API, the particular security feature to the second data set.

18. The method of claim 1, wherein the sensitive type does not include the particular security feature.

19. The method of claim 1, wherein:
storing the first mapping comprises storing a table that includes a first column and a second column;
the first mapping is reflected in a row in the table;
the first column stores first data that indicates data security policies and the second column stores second data that indicates sensitive types.

20. One or more non-transitory storage media storing instructions which, when executed by one or more processors, cause:
storing, in a computer system, a first mapping that maps a data security policy to a sensitive type, wherein the data security policy includes a particular security feature;
storing, in the computer system, a second mapping that maps the sensitive type to one or more data sets;
based on the first mapping and the second mapping, applying the particular security feature to each data set of the one or more data sets.

21. The one or more non-transitory storage media of claim 20, wherein a data set in the one or more data sets is one of a tablespace, a table, a column of a table, a file in a file system, or a directory in the file system.

22. The one or more non-transitory storage media of claim 20, wherein:
the data security policy includes a plurality of security features that includes the particular security feature;
the instructions, when executed by the one or more processors, further cause applying each security feature of the plurality of security features to each data set of the one or more data sets.

23. The one or more non-transitory storage media of claim 20, wherein:
the particular security feature is related to a first type of security;
a second security feature, in the data security policy, that is different than the particular security feature and is related to a second type of security that is different than the first type of security;
the first type of security is one of encryption, redaction, access control, or auditing;
the second type of security is another one of encryption, redaction, access control, or auditing.

24. The one or more non-transitory storage media of claim 20, wherein:
the second mapping maps the sensitive type to a plurality of data sets;
applying comprises applying the particular security feature to each data set of the plurality of data sets.

25. The one or more non-transitory storage media of claim 20, wherein the instruction, when executed by the one or more processors, further cause:
receiving input that indicates adding a new security feature to the data security policy;
in response to receiving the input:
updating the data security policy to indicate the new security feature,
based on the new security feature and the second mapping, applying the new security feature to each data set of the one or more data sets.

26. The one or more non-transitory storage media of claim 20, wherein the instructions, when executed by the one or more processors, further cause:
receiving input that indicates associating, within the first mapping, a second sensitive type with a second security policy that includes a plurality of security features;
in response to receiving the input:
updating the first mapping to include an association between the second security policy and the second sensitive type;
identifying one or more second data sets that are associated, in the second mapping, with the second sensitive type;
applying each security feature in the plurality of security features to each data set in the one or more second data sets.

27. The one or more non-transitory storage media of claim 20, wherein the instruction, when executed by the one or more processors, further cause:
receiving input that indicates deleting the particular security feature from the data security policy;
in response to receiving the input:
updating the data security policy to not indicate the particular security feature,
based on the second mapping and updating the data security policy, undoing the particular security feature relative to each data set of the one or more data sets.

28. The one or more non-transitory storage media of claim 20, wherein the instruction, when executed by the one or more processors, further cause:
receiving input that indicates deleting, in the first mapping, an association between a second sensitive type and a second security policy that includes a plurality of security features;
in response to receiving the input:
updating the first mapping to exclude the association between the second security policy and the second sensitive type;
identifying one or more second data sets that are associated, in the second mapping, with the second sensitive type;
undoing each security feature in the plurality of security features relative to each data set in the one or more second data sets.

29. The one or more non-transitory storage media of claim 20, wherein:
after storing the first mapping and prior to storing the second mapping and applying the particular security feature, the particular security feature is not applied to any data set;
the instruction, when executed by the one or more processors, further cause receiving input that indicates the second mapping;
applying the particular security feature is performed in response to receiving the input.

30. The one or more non-transitory storage media of claim 20, wherein the instruction, when executed by the one or more processors, further cause:
receiving input that indicates a second sensitive type that is to be associated with the data security policy;
in response to receiving the input, updating the first mapping to indicate an association between the data security policy and the second sensitive type.

31. The one or more non-transitory storage media of claim 20, wherein the instruction, when executed by the one or more processors, further cause:
receiving input that indicates (1) a particular data set that is different than each data set in the one or more data sets and (2) that the particular data set is to be associated with the sensitive type;
in response to receiving the input:
updating the second mapping to indicate an association between the sensitive type and the particular data set;
based on the first mapping and the updating, applying the particular security feature to the particular data set.

32. The one or more non-transitory storage media of claim 20, wherein storing the first mapping comprises storing the first mapping that maps the data security policy to a plurality of sensitive types that includes the sensitive type.

33. The one or more non-transitory storage media of claim 20, wherein applying the particular security feature to each data set of the one or more data sets comprises calling, by a first component, an application programming interface (API) of a second component that is different than the first component and that applies, based on calling the API, the particular security feature to each data set of the one or more data sets.

34. The one or more non-transitory storage media of claim 20, wherein:
causing the particular security feature to be applied to each data set of the one or more data sets comprises causing a plurality of security features that includes the particular security feature to be applied to each data set of the one or more data sets;
the plurality of security features includes a first security feature and a second security feature that is different than the first security feature;
applying the plurality of security features to each data set of the one or more data sets comprises:
calling, by a first component, a first application programming interface (API) of a second component that is different than the first component and that applies, based on calling the first API, the first security feature to each data set of the one or more data sets;
calling, by the first component, a second application programming interface (API) of a third component that is different than the first component and the second component and that applies, based on calling the second API, the second security feature to each data set of the one or more data sets.

35. The one or more non-transitory storage media of claim 20, wherein:
applying the particular security feature to each data set of the one or more data sets comprises causing the particular security feature to be applied to each data set of a plurality of data sets;
the plurality of data sets includes a first data set and a second data set that is different than the first data set;
applying the particular security feature to each data set of the one or more data sets comprises:
calling, by a first component, a first application programming interface (API) of a second component that is different than the first component and that applies, based on calling the first API, the particular security feature to the first data set;
calling, by the first component, the first API of the second component that applies, based on calling the first API, the particular security feature to the second data set.

* * * * *